United States Patent
Gosselin (10) Patent No.: US 7,820,069 B2
(45) Date of Patent: Oct. 26, 2010

(54) METHOD AND APPARATUS FOR CONTROLLING CONTAMINATION FROM PIPE COATINGS

(76) Inventor: Michael Gosselin, 22 Jefferson Cir., Clinton, CT (US) 06413-1518

( * ) Notice: Subject to any disclaimer, the term of this patent is extended or adjusted under 35 U.S.C. 154(b) by 0 days.

(21) Appl. No.: 12/460,305

(22) Filed: Jul. 16, 2009

(65) Prior Publication Data

US 2010/0029879 A1    Feb. 4, 2010

Related U.S. Application Data (63) Continuation-in-part of application No. 11/440,897, filed on May 25, 2006.

(60) Provisional application No. 60/684,917, filed on May 26, 2005, provisional application No. 61/135,037, filed on Jul. 16, 2008.

(51) Int. Cl.
  C01B 15/08 (2006.01)
  A62D 3/38 (2007.01)
  A62D 3/30 (2007.01)
  A62D 101/20 (2007.01)
  C02F 1/72 (2006.01)

(52) U.S. Cl. ............ 252/186.22; 252/186.21; 252/186.27; 252/186.29; 252/186.43; 588/320; 588/405; 210/758; 210/759

(58) Field of Classification Search ......... 252/186.21, 252/186.22; 588/320, 405
See application file for complete search history.

(56) References Cited

U.S. PATENT DOCUMENTS

| | | | |
|---|---|---|---|
| 2,468,027 A * | 4/1949 | Britton et al. ............ 526/93 |
| 4,009,063 A * | 2/1977 | Wood ..................... 156/71 |
| 5,116,388 A * | 5/1992 | Brooks ..................... 8/405 |
| 5,688,867 A * | 11/1997 | Scheibelhoffer et al. .... 525/168 |
| 5,877,389 A * | 3/1999 | Sorokin et al. ............ 588/316 |
| 6,620,408 B2 * | 9/2003 | Hoeffkes et al. ............ 424/62 |
| 6,703,004 B2 * | 3/2004 | Narasimhan et al. ........ 424/62 |
| 2002/0061955 A1 * | 5/2002 | Colvin et al. ............. 524/493 |
| 2002/0139957 A1 * | 10/2002 | Matsuo et al. ........... 252/186.1 |
| 2003/0135937 A1 * | 7/2003 | Barrass et al. .............. 8/408 |
| 2006/0269492 A1 * | 11/2006 | Narasimhan et al. ........ 424/62 |
| 2006/0270761 A1 * | 11/2006 | Gosselin ................... 523/514 |
| 2007/0000070 A1 * | 1/2007 | Vena et al. ................. 8/405 |

* cited by examiner

Primary Examiner—Joseph D Anthony
(74) Attorney, Agent, or Firm—Ober, Kaler, Grimes & Shriver; Royal W. Craig (57) ABSTRACT

A combination of a styrene reduction agent and a catalyst that effectively and economically reduces styrene emissions in Cured-In-Place Pipe, closed molding processes. The reduction agent generally comprises a calibrated mixture of salts including sodium chloride plus three persulfate salts: ammonium (APS), potassium (KPS), and sodium (NPS). These ingredients are combined in powder form and are compressed into soluble capsules containing calibrated amounts of the mixture. The capsule(s) may be prescribed through the use of software. The catalyst is hydrogen peroxide ($H_2O_2$). A calibrated amount of the styrene reduction agent capsule(s) are added to the cure water prior to starting the boiler equipment for the Cured-In-Place Pipe process, and this is followed by a calibrated amount of the $H_2O_2$ catalyst in order to reduce the residual monomer content in either process or waste streams.

7 Claims, 6 Drawing Sheets

Chemical Name: StyRedux
Physical Form: White, crystalline
Active Oxygen Content: 6.4% Minimum Chemical Name: StyRedux SP
Physical Form: Liquid
A.O.C. 3.1% Minimum

| Pipe Diameter (inches*) | Length (feet) | Process** Time (hours @ 180°F) |
|---|---|---|
| 8.0 | 800 | 3.0 |

Input data in yellow boxes

| Amount of styrene in the process water (ppm) +- 5% | Amount of water used**** (gallons) | Amount of styrene present in the water (gallons) | Amount of styrene present in the water (pounds) |
|---|---|---|---|
| 240 | 1,873.6 | 0.50 | 3.75 |
|  | 3x Cooling 5,621 |  |  |

| Amount of styrene in the process water after addition*** (ppm) | Percent Styrene Reduction | | StyRedux amount to add to the process water (Capsules) |
|---|---|---|---|
| 39 | 84% |  | 4 |
| equal to or lower | | | |

Amount of styrene present in the water after treatment (pounds)

*In Addition to StyRedux*

| H2O2 amount to add to the process water (Gallons) | Percent *System* Styrene Reduction |
|---|---|
| 0.38 | 96% |

0.61
equal to or lower

Amount of styrene present in the water after *Total System* treatment (pounds)

0.13
equal to or lower

* Calculations are based upon a 93% composite diameter of the host pipe with a 0.01" thick thermoplastic coating
** Time water is present or "cure-time".
*** Additive addition after process water is at 180 F.
**** Water in boiler / hoses included.

FIG. 1

Thermoplastic film (0.01") styrene weight gain over time @ temperature

| Temperature,°F | After 1 hour | After 2 hours | After 3 hours | After 4 hours | Average | Sigma |
|---|---|---|---|---|---|---|
| 65 | 17.8% | 18.5% | 19.0% | 19.0% | 18.6% | 0.5% |
| 100 | 30.4% | 29.5% | 29.7% | 29.5% | 29.8% | 0.4% |
| 120 | 39.2% | 38.8% | 39.1% | 37.9% | 38.7% | 0.6% |
| 140 | 51.6% | 49.7% | 50.9% | 50.2% | 50.6% | 0.8% |
| 160 | 73.8% | 70.3% | 67.4% | 65.6% | 69.3% | 3.6% |
| 180 | 107.2% | 106.0% | 78.3% | 83.0% | 93.7% | 15.1% |

* Calculations are based upon a 93% composite diameter of the host pipe with a 0.01" thick thermoplastic coating.
** Time wate

| Temperature,°F | Weight Absorption |
|---|---|
| 150 | 30.0% |

| 3.1325 | grams of styrene per linear in$^2$ |

FIG. 2

Thermoplastic film (0.01") styrene extraction rates (1 linear inch²)

| Temperature,°F | Initial weight | After 1 hour | After 2 hours | After 3 hours | After 4 hours |
|---|---|---|---|---|---|
| 65 | 1.3913 | 1.2009 | 1.1398 | 1.0795 | 1.0486 |
| 100 | 1.2553 | 1.0321 | 0.9127 | 0.8664 | 0.8362 |
| 140 | 1.3965 | 1.2068 | 1.0617 | 1.0060 | 0.9579 |
| 160 | 1.2398 | 1.0241 | 0.8567 | 0.8293 | 0.8101 |
| 180 | 1.2553 | 1.0207 | 0.9154 | 0.8740 | 0.8472 |

Thermoplastic film (0.01") styrene weight loss over time @ temperature

| Temperature,°F | After 1 hour | After 2 hours | After 3 hours | After 4 hours |
|---|---|---|---|---|
| 65 | -13.7% | -18.1% | -22.4% | -24.6% |
| 100 | -17.8% | -27.3% | -31.0% | -33.4% |
| 140 | -13.6% | -24.0% | -28.0% | -31.4% |
| 160 | -17.4% | -30.9% | -33.1% | -34.7% |
| 180 | -18.7% | -27.1% | -30.4% | -32.5% |
|  | 1 | 2 | 3 | 4 Hours |
| Averages | -16.2% | -25.5% | -29.0% | -31.3% |
| Sigma | 2.4% | 4.8% | 4.1% | 3.9% |

| Time | Weight Extraction |
|---|---|
| 6 | -36.4% |

| 1.141 | grams of styrene per linear inch |

Thermoplastic Film Extraction of Styrene

\* Calculations are based upon a 93% composite diameter of the host pipe with a 0.01" thick thermoplastic coating .
\*\* Time wate

FIG. 3

Amount of styrene in process water [3.94] pounds [0.52] gallons, plus or minus 5%

Amount of water in host pipe [15,172.2] pounds [1,823.6] gallons

Amount of water in boiler and hoses [416.0] pounds [50.0] gallons

Styrene in process water [253] ppm, plus or minus 5%

Ammonium peroxydisulfate CAS# 7727-54-0
Molar mass 228.2
Assay 99%, Active oxygen content 7.0%

Potassium peroxydisulfate CAS# 7727-21-1
Molar mass 270.3
Assay 99%, Active oxygen content 5.9%

Sodium peroxydisulfate CAS# 7775-27-1
Molar mass 238.1
Assay 99%, Active oxygen content 6.7%

| | Low Weight | High Weight | Average Weight | A.O.C. |
|---|---|---|---|---|
| APS | 30.5% | 35.5% | 32.5% | 2.3% |
| KPS | 30.5% | 35.5% | 32.5% | 1.9% |
| NPS | 30.5% | 35.5% | 32.5% | 2.2% |
| Salt | 0.0% | 5.0% | 2.5% | 0.0% |
| | 91.5% | 111.5% | 100.0% | 6.4% |
| | 107.3 grams | | 27.3 grams | 4 capsules |

6 phr persulfates to 100 parts styrene
* Calculations are based upon a 93% composite diameter of the host pipe with a 0.01" thick thermoplastic coating.
** Time wate

FIG. 4

| | | |
|---|---|---|
| 1000.0100 | Grams | |
| 0.00100% | Styrene present | |
| 43.7891 | Grams, removed this amount and used as "Control sample". | |
| 956.2209 | Grams of left over solution. | |
| 0.07600 | Grams of persulfate solution added | |
| 0.0004% | Persulfate present | |
| 956.2969 | Total weight divided into six vials and exposed for the following times and temperatures: | |

158.0000 grams
5.063% Persulfate present

Styrene, ppm 17

| | | Reduction |
|---|---|---|
| Styrene, ppm | 4 | 180°F @ 1 hour | ERR |
| Styrene, ppm | 4 | 180°F @ 2 hour | ERR |
| Styrene, ppm | 2 | 180°F @ 4 hour | ERR |

| | 2 phr | 4 phr | | |
|---|---|---|---|---|
| 1 | 0% | ERR | 180°F @ 1 hour | |
| 2 | 0% | ERR | 180°F @ 2 hour | |
| 4 | 0% | ERR | 180°F @ 4 hour | |
| | 0% | | 0% | |
| | 0% | | 0% | |
| | 0% | | 0% | |
| | 0% | ERR | | ERR |

Based upon the above two reductions, 6 phr of persulfates is sufficient to polymerize the residual styrene present in the water. Low gains (waste) with more than 6 phr.

METHOD AND APPARATUS FOR CONTROLLING CONTAMINATION FROM PIPE COATINGS

CROSS-REFERENCE TO RELATED APPLICATION(S)

The present application is a continuation-in-part of U.S. application Ser. No. 11/440,897 filed May 25, 2006 (which in turn derives priority from U.S. Provisional Application No. 60/684,917 filed May 26, 2005), and further derives priority from U.S. Provisional Application No. 61/135,037 filed 16 Jul. 2008.

BACKGROUND OF THE INVENTION

1. Field of Invention

The present invention relates to the reduction of residual styrene from a thermoset resin and, more particularly, to a styrene polymerization agent in aqueous environments that effectively and economically reduces styrene emissions and effluents in moist environments.

2. Description of the Prior Art

The composites industry today is experiencing significant growth as an ever-increasing number of industry applications are being found for reinforced plastics. This is largely owing to the durability, strength, cost and expected lifetime of such plastics. One application in particular is the Cured-In-Place Pipe (CIPP) industry, in which piping systems are repaired through the application of resin compounds to damaged pipe surfaces while the pipes remain buried underground. Underground pipes are used for the transport of petroleum, natural gas, chemicals, municipal water, and the like. Due to exposure to a number of influences over time such as, for example, temperature fluctuations, ground movements, corrosive fluids, etc., these pipes tend to crack and damage. As a result, the pipes often are unable to successfully transport the above mentioned fluids and thus become unsuitable for their intended use. The Cured-In-Place Pipe (CIPP) method for repair can solve this problem without expensive excavation. For example, U.S. Pat. No. 4,009,063 by Wood issued Feb. 22, 1977 shows a method of lining pipe with a hard, rigid pipe of thermosetting resin using a tubular fibrous felt immersed in the resin to form a carrier for the resin. The immersed felt and resin are expanded by an inflatable tube to shape the resin to the passageway surface until the resin is cured to form a hard, rigid lining pipe with the felt embedded therein. The resin is a thermosetting resin which contains a catalyst, and hot air, water, a combination of air and water or ultraviolet light (UV) is used to activate the catalyst or UV initiator causing the resin to cure and form a rigid liner.

Another approach involves utilizing glass fiber which is woven into a tubular shape. The glass fiber is impregnated with a thermosetting resin containing a catalyst, and the resin is then cured. Carbon fiber may be interwoven with the glass fiber such that curing may be accomplished by applying an electrical current to the carbon fibers to generate heat. As a result, the catalyst is activated and the resin cures forming a rigid pipe lining. In this instance, hot air or hot water is not required.

There are still other methods that rely on UV curing. In all such cases the higher temperature or light provides the energy to cure the thermosetting resin, causing it to harden into a structurally sound, jointless pipe-within-a-pipe. Unfortunately, during the curing process, the curing water/condensate becomes contaminated with styrene that has permeated through the film coating material. Indeed, the leaching of styrene through the coating material is apparent as an oily substance on the coating even prior to installation. This poses grave environmental health concerns for air emissions as well as process effluents released downstream, into treatment plants, or in the case of storm sewer rehabilitation: streams, rivers, lakes, public and private water supplies. During the process, employee and public safety is at risk.

Employee exposure is tightly regulated by an Occupational Safety and Health Administration (OSHA) workplace airborne threshold limit value (TLV) of 50 parts per million (ppm) in many states. Releases to the air are regulated by the Clean Air Act (CAA) National Emission Standards for Hazardous Air Pollutants (NESHAP) for plastic composites and boat manufacturing. Releases to the water are regulated by the Clean Water Act (CWA). The Environmental Protection Agency (EPA) and the local Department of Environmental Protection (DEP) agencies have styrene listed as a reportable hazardous chemical. California has listed styrene as a carcinogen. Other states have styrene listed as a possible carcinogen and a marine pollutant. Compliance to regulating authorities can only be met by cost-effectively implementing pollution preventive methods and technologies that reduce toxic and hazardous emissions.

The problem is highlighted in the following article: "Odour Control—More than Sewage when Installing Cured-In-Place Pipe Liners", NASTT No-Dig, March 2004, Gerry Bauer, P. Eng. & David McCartney, P. Eng, City of Ottawa. The City of Ottawa Canada identified five sections of sewer for rehabilitation by a cured-in-place pipe methods. The contract was tendered, but during lining of the initial sections, numerous complaints were received from the public regarding an unpleasant odor in their homes. Investigations revealed that the odor complaints occurred as a result of styrene. The solution mentioned in this report was to dilute the air concentration with equipment, fans above a manhole. Regulatory agencies require reduction at the source means and not by dilution. No testing on the release water was implemented.

Another problem highlighting Cured-In-Place Pipe emissions is: "Fumes From Va. Sewer Work Cited In Illnesses", Washington Post Staff Writer, Annie Gowen, May 12, 2004, Page B08. The residents of the Warwick Village neighborhood of Alexandria, Va. were affected by styrene fumes from a CIPP application to their sanitary sewer system. High concentrations were reported on hoses used in the operation, no testing from the source have been reported.

Yet another problem where health officials were called in to investigate, Schlitz Park Office Building, Milwaukee County, Wis. Styrene fumes entered the building through drains and foundation walls. Employees were evacuated and some missed work for months. Fans were used to create airflow to dilute concentrations of styrene. Process water testing at the source was not part of the investigation.

"Styrene is a common chemical component used in rubber and plastics industries to make packaging, insulation and fiberglass products. It is also associated with combustion processes such as automobile exhaust and cigarette smoke. The odor threshold for styrene has been reported to be 50 parts per billion (Plog 1988). It has been described as having a sweet, sometimes irritant odor. It is slightly soluble in water and is volatile. The most common health effects associated with styrene exposure are mucous membrane irritation and central nervous system effects (e.g. depression, concentration problems, muscle weakness, tiredness, and nausea). Recovery short term effects is typically rapid upon removal from exposure (ATSDR 1992)". Health Consultation, Schlitz Park Office Building, WI, Sep. 13, 2005, U.S Department of Health and Human Services, Agency for Toxic and Disease Registry, Division Of Health Assessment and Consultation, Atlanta, Ga.

There are conventional styrene reduction strategies including the following:

1. Using low styrene content resins: Although many of these resins are currently available from resin suppliers, this method does not lend to every process, and the physical properties of the final product can be affected. In some instances, the reduction of styrene is not significant enough to make a difference, and in some cases, styrene emissions may even increase.
2. Using controlled spay-on techniques is another method for reducing styrene emissions. This method is very effective and works by controlling the amount of surface area of the wet resin which is exposed to the air, whether spraying gel coat or plain resin.
3. Addition of paraffin wax is another method of reducing styrene emissions. This suppresses styrene emissions through the film it provides but, in doing so, creates the problem of secondary bonding between the laminates which can cause the further delamination of the composite resulting in a structural weakness.
4. Using alternate monomers is a forth method of reducing styrene emissions. Alternate monomers such as methyl methacrylate, vinyl toluene and butyl styrene can be used, or it is possible to use olygomers, which basically consist of two or three molecules that have been combined. They work effectively but can be very expensive and, in addition, some can be more toxic than styrene or made from styrene derivatives, also considered HAP and VOC compounds.
5. Using a closed molding process is another method. This can be extremely effective in lowering styrene emissions, but equipment cost and maintenance cost is a great disadvantage.
6. Using a styrene suppressant is another option.

Further to option 6, a number of styrene suppressant additives are currently available to the composite fabricator. They are most effective when using the open-molding processes and, when properly used, can reduce styrene emissions during the curing stage of the composite. Styrene suppressant agents can effectively and economically reduce styrene emissions when properly used in any open-molding process. Specifically, the advantages of Styrene Reduction in CIPP Cure Water are:

i. No additional equipment needed for as much as a 75% reduction
ii. Minor equipment needed for reductions above 75%
iii. Mixing not required, simply add required amount in water soluble packaging
iv. Non-toxic, Non-Hazardous
v. Meets all compliance regulations By way of example, Styrid™ is an existing Styrene suppressant additive manufactured by Specialty Products Company to reduce the amount of styrene vapors escaping from the composites. Styrid™ and most other styrene suppressant formulations contain wax and other components that produce a film on the top of the laminate, creating a barrier which prevents styrene, or organic diluents, from leaving the composite in the form of a vapor during the curing stage. Styrid™ creates a film similar to that provided by paraffin wax.

It would be greatly advantageous to preserve all the above-identified qualities of existing Styrene suppressant formulations and yet provide an even higher level of effectiveness, and worker and public safety, with an advantage to economically reduce HAP and VOC emissions.

The present inventor's co-pending U.S. patent application Ser. No. 11/440,897 for "Styrene Reduction Agent" describes an agent including sodium chloride plus a mixture of persulfate salts: ammonium (APS), potassium (KPS), and sodium (NPS), combined in powder form compressed into soluble capsules for effectively and economically reducing styrene emissions in CIPP. The inventor has now discovered that a calibrated amount of hydrogen peroxide ($H_2O_2$) serves as an effective catalyst to increase reactivity and proceed to full reduction of toxics and pollutants.

SUMMARY OF THE INVENTION

It is therefore, a primary object of the present invention to provide a styrene reduction agent, initiator or oxidizer that effectively and economically reduces styrene, or reactive diluent, in Cured-In-Place Pipe, or other surface coating processes, in combination with a catalyst comprising hydrogen peroxide ($H_2O_2$) to increase reactivity of the styrene reduction agent and ensure quicker and more complete reduction of toxics and pollutants.

It is another objective to reach a higher level of effectiveness than prior art reduction agents.

It is still another objective to simplify the task of implementing the reactive diluent reducing agent directly into the curing medium in a predetermined quantity and an easy-to-calibrate manner.

It is still another objective to remove polymerized reactive diluent along with small concentrations of un-reacted diluents that may remain in the process.

It is another objective to polymerize absorbed reactive diluents on the surface of said coating of reactive diluents either: miscible, soluble in water or non-soluble in water.

These and other objects are accomplished with a styrene reduction agent plus a catalyst that combine to effectively and economically reduce styrene emissions in Cured-In-Place Pipe or other surface coating curing processes. Generally, the invention comprises a calibrated mixture including persulfate salts (Peroxodisulfates), plus hydrogen peroxide ($H_2O_2$) as a catalyst to increase reactivity of the styrene reduction agent. A method is also disclosed for incorporating both into the Cured-In-Place Pipe process and then removing them from the Cured-In-Place Pipe processes in such a way as to reduce styrene emissions by 75% and more. More specifically, the mixture includes ammonium persulfate (APS) and/or potassium persulfate (KPS) and/or sodium persulfate (NPS) with sodium chloride (NaCL) combined in the following preferred concentrations within acceptable ranges:

| Product | % by weight |
|---------|-------------|
| APS | 30 |
| KPS | 35 |
| NPS | 30 |
| NaCL | 05 |

The calibrated amounts of the persulfate salt mixture are encapsulated in a water soluble packaging for addition to the cure water. Preferably, the packaging comprises capsules for material handling and product safety. The capsule(s) may be added to the cure water at anytime during the process. For example, the capsule(s) may be added prior to starting the heating equipment, or boiler, for the Cured-In-Place Pipe process in order to reduce the residual monomer, styrene, content in either the process or waste streams. The addition of the capsules is followed by addition of a calibrated amount of hydrogen peroxide ($H_2O_2$), which serves as an effective catalyst to increase reactivity and proceed to full reduction of toxics and pollutants.

The capsules in combination with the $H_2O_2$ facilitate safe, quick and ready deployment.

DETAILED DESCRIPTION OF THE PREFERRED EMBODIMENT

The present invention is a styrene reduction agent, or "initiator/oxidizer", in combination with a catalyst comprising a calibrated amount of hydrogen peroxide ($H_2O_2$), the combination effectively and economically reducing styrene emissions and effluents in Cured-In-Place Pipe closed molding processes by means of emulsion polymerization.

The styrene reduction agent comprises a calibrated mixture of peroxodisulfates, also known as Persulfate salts, and the preferred catalyst is a calibrated amount of Hydrogen Peroxide solution. A method of calculating and incorporating the styrene reduction agent and catalyst into the Cured-In-Place Pipe process is also disclosed in such a way as to reduce styrene emissions and effluents by as much as 75% or more.

More specifically, the styrene reduction agent is preferably a composite of sodium chloride (NaCl) plus three persulfate salts: ammonium persulfate (APS), potassium persulfate (KPS), and sodium persulfate (NPS). The APS is available as a white crystalline powder which begins to decompose when heated to 120° C. It is known as a strong oxidant and is widely used in the organic synthetic industry as an initiator for polymerization of polymer compounds. The KPS is likewise available as a white crystalline powder, soluble in water, and decomposes at temperatures of approximately 100° C. It too is a strong oxidant and has been traditionally used for chemical bleaching, and as an accelerator for polymerization of vinyl chloride resin emulsion. The NPS is also available as a white, crystalline, odorless salt. NPS is conventionally used as initiator for the polymerization of monomers and as a strong oxidizing agent in many applications. The NaCL is conventional salt. In accordance with the present invention, The APS, KPS, NPS and NaCL are combined in the following relative concentrations:

| Product | Preferred Amt (% by weight) | Optimum Range (+/- % by weight) | Possible Range (+/- % by weight) |
|---------|---|---|---|
| APS | 32.5 | 25-35 | 0-100 |
| KPS | 32.5 | 30-40 | 0-100 |
| NPS | 32.5 | 25-35 | 0-100 |
| NaCL | 2.5 | <10 | 0-10 |

The ingredients are combined in powder form and, in accordance with the present invention, the mixture is compressed into soluble capsules containing calibrated amounts of the mixture. The capsules are used in packaging for dispersion. The capsules are preferably soluble gel capsules (veterinarian grade), size SU-07 (the largest currently available. Other types of packaging can be easily deployed including dispensing powder directly, dispensing powder into an inert liquid and then dispensing. Typical weight of one capsule is 30 grams +/-5 grams.

The styrene reduction agent capsule(s) may be added to the cure water prior to starting the boiler equipment for the Cured-In-Place Pipe process in order to reduce the residual monomer content in either the process or waste streams. The capsules facilitate quick and ready deployment of the mixture.

An amount of hydrogen peroxide ($H_2O_2$) is then added in solution form to the cure water based likewise on the weight of reactive monomer or aromatic hydrocarbon. Specifically, $H_2O_2$ may be added within a range of from 0.1-10:1 w/w of reactive monomer or aromatic hydrocarbon. This is also how the styrene reduction agent capsule(s) are added, and so the $H_2O_2$ may be added on a 1:1 basis relative to the styrene reduction agent weight/weight ratio. In other words, a 6 Pph ratio of styrene reduction agent to styrene in the cure water results in a ratio of 6 Pph of $H_2O_2$. Of course, the styrene off gassing during exotherm and residual monomers in the resin composite is difficult to predict or estimate in the challenging applications of CIPP. Future monitoring of percent reduction may alter the dosage of styrene reduction agent and/or $H_2O_2$. Additionally, Styrene Reduction Agent may be used solely or $H_2O_2$ may be used solely if extra dosage is required (as determined by monopersulfate test strips or hydrogen peroxide testing strips). The intent is to maintain low concentrations of either/any added chemical to a minimum prior to release into the environment, but also maintain optimum polymerization of monomer/hydrocarbons.

The addition of styrene reduction agent together with hydrogen peroxide catalyst will increase reactivity and proceed to full reduction of toxics and pollutants. Reductions of aromatic hydrocarbons can be accomplished at ambient temperatures over a longer cure time which will proceed quickly from the heat supplied by the exothermic reaction. The heat/energy from the exothermic reaction is determined from the resin system, i.e. catalyst, promoters, initiators and the like to increase conversion rates of the reactive chemical solution added.

The hydrogen peroxide ($H_2O_2$) catalyst may be obtained from FMC Corporation, Philadelphia, Pa. or a variety of other chemical companies. Hydrogen Peroxide is commercially available in many concentrations: 35, 50 and 70% w/w are common for industrial applications, while a 3% solution w/w is common for topical solutions. Transportation regulations are more stringent for concentrations over 8%, and so a less than 8% solution is preferred, and specifically a Hydrogen Peroxide Solution diluted (DI) to 3% by weight is suggested.

While the amount per capsule may vary, the size of the capsule or packaging may vary, the composition of the packaging may vary, or the powder may be pre-dispersed in a non-reactive fluid, the specific guidelines for use herein described with a stepwise example.

Step 1. Calculate amount to be used for the CIPP liner. This is accomplished with the assistance of either a software calculator or a predetermined "look-up" table. The software is based on extrapolation from laboratory testing data, and is essentially a spreadsheet equation based on linear progression from absorption and extraction tests.

A. The input variables are as follows:
  i. Diameter of pipe (inches)
  ii. Length of pipe (feet)
  iii. Process time at 180° F. (hours)

B. The outputs from the software are:
  i. Amount of styrene in process water (ppm, gallons, pounds, etc.)
  ii. Amount of process water used (gallons)
  iii. Amount of capsules to add to the water (capsule(s))
  iv. Amount of styrene after treatment (ppm)
  v. Percent removal accomplished (%)
  vi. Amount of hydrogen peroxide ($H_2O_2$) catalyst to add to the water
  vii. Amount of styrene after treatment (pounds)
  viii. Percent removal accomplished (%)

The software module essentially calculates from the input variables the amount of process water used during the Cured-In-Place Pipe process, and calculates the amount of residual styrene present in the process water from collected data. The software then calculates the amount of residual styrene that will be present in the process water, and calculates the remedial amount of the present mixture.

For example, given input variable as follows:
  Diameter: 8"
  Length: 800'
  Process Time@ 180° F.: 5 hours The software output will be as follows:

| | |
|---|---|
| Amount of styrene in the process water: | 240 ppm |
| Amount of water used for inversion/filling: | 1,873.6 gal |
| Note: General multiplier for cooling: x3: | 5,621 gal |
| Amount of styrene present in the water: | 0.5 gallons |
| Amount of styrene present in the water: | 3.73 pounds |
| Amount of styrene in the process water after addition: Equal to or lower | 39 ppm |
| Percent Styrene Reduction: | 84% |
| Styrene reduction agent to add to the process water (1,873.6 gallons) | 4 capsules |
| Amount of styrene present in the water after treatment: (equal to or lower) | 0.61 pounds |
| Amount of hydrogen peroxide ($H_2O_2$) to add to the water | 0.38 pounds |
| Amount of styrene after treatment (pounds) | 0.13 pounds |
| Percent removal accomplished (%) | 96% |

Figure 1:
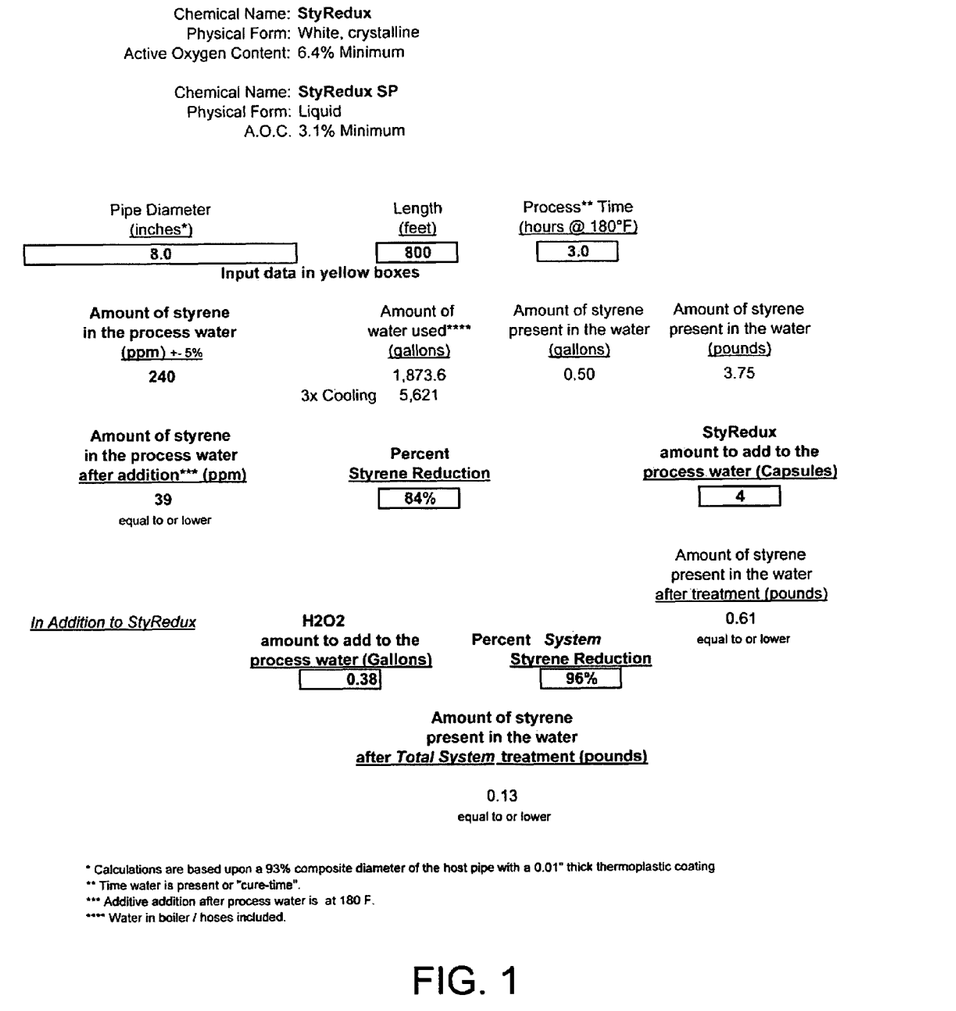
FIG. 1. is a graphical analysis of the calculations for calibrating the amount of the present mixture to be added FIG. 2. is a graphical depiction of the present styrene reduction calculations indicative of the efficacy of the capsules.
Figure 2:
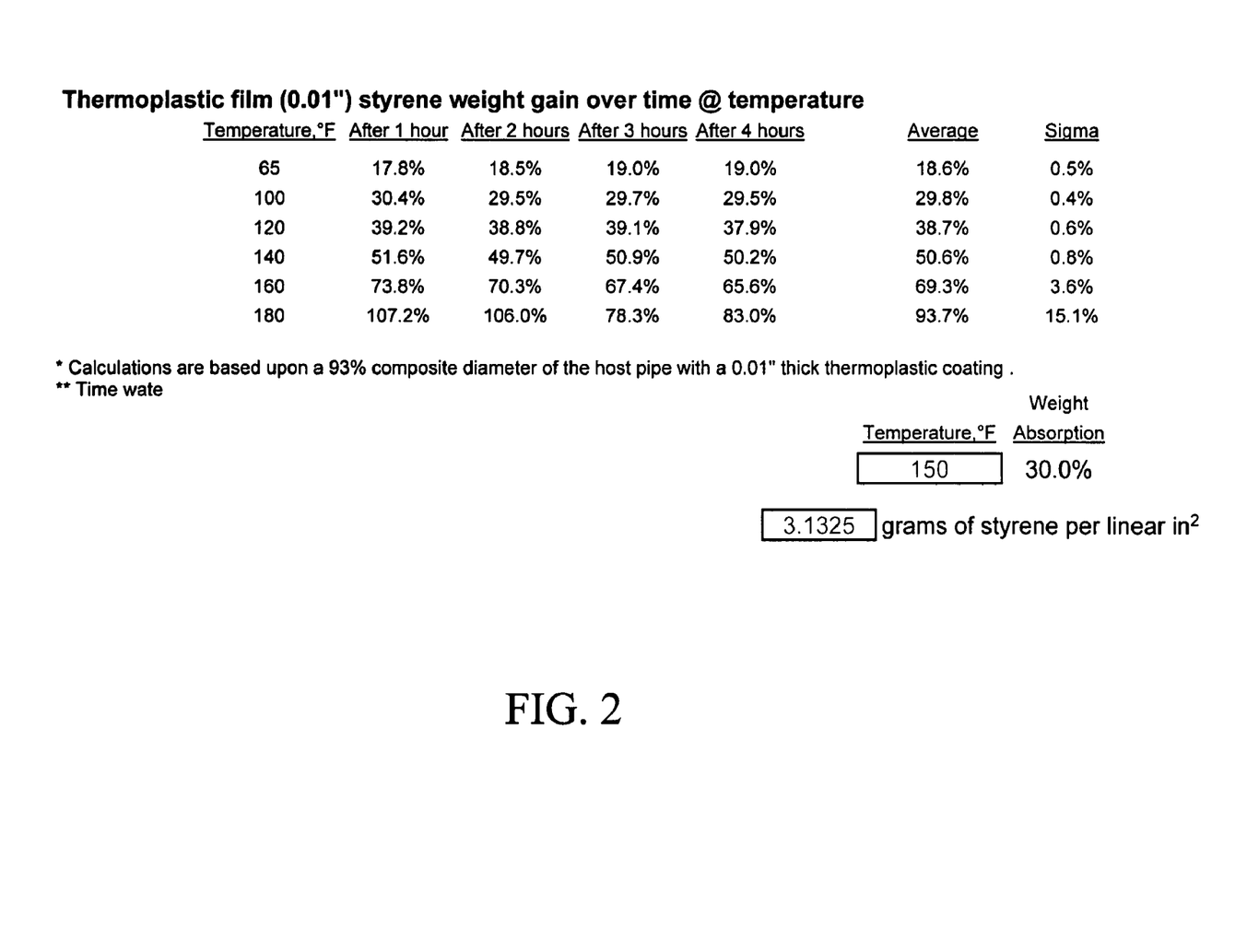
Figure 3:
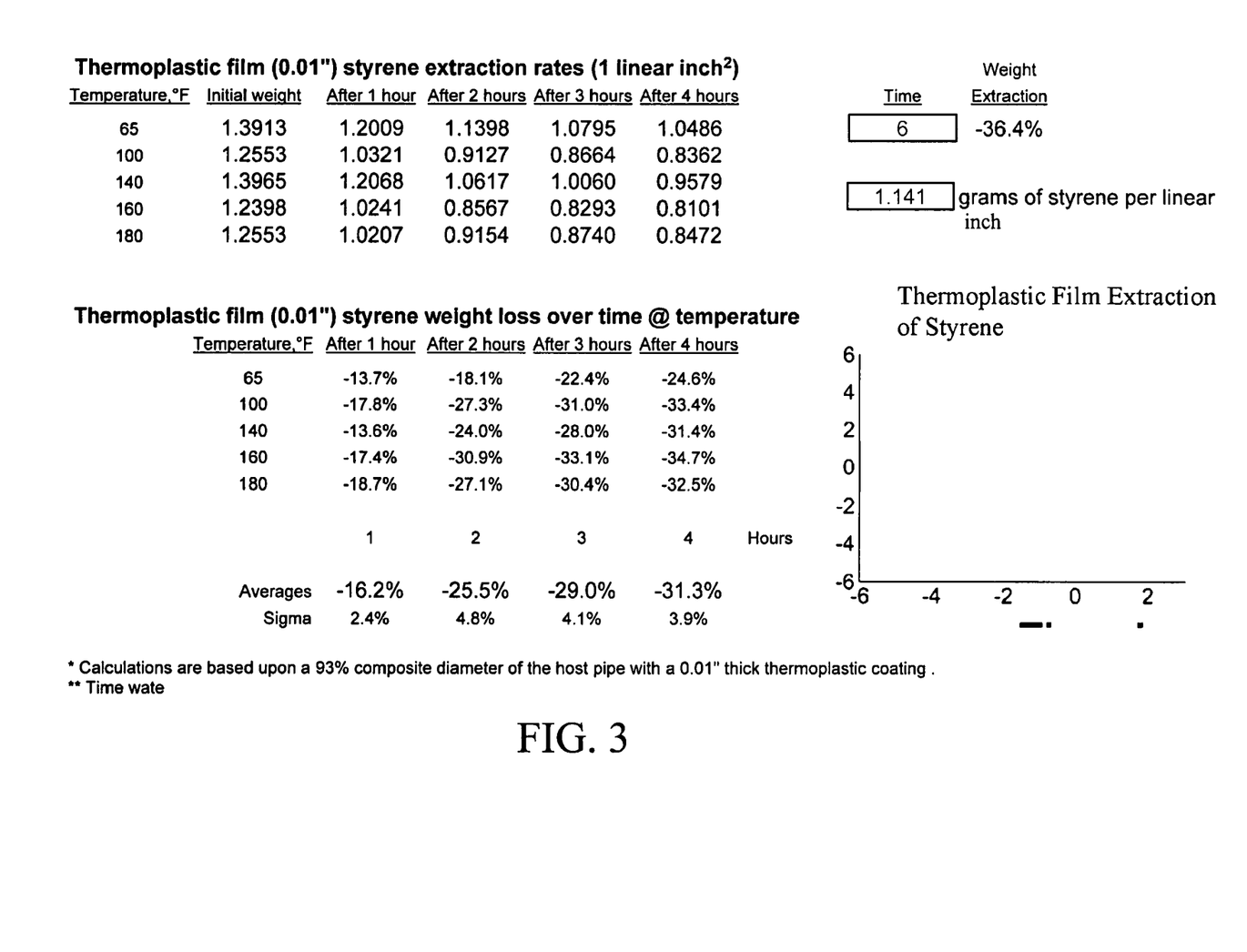
FIG. 3. is a drawing of a StyRedux™ Capture System, when placed into operation will capture, filter, polymerized styrene and non-polymerized styrene.
Figure 4:
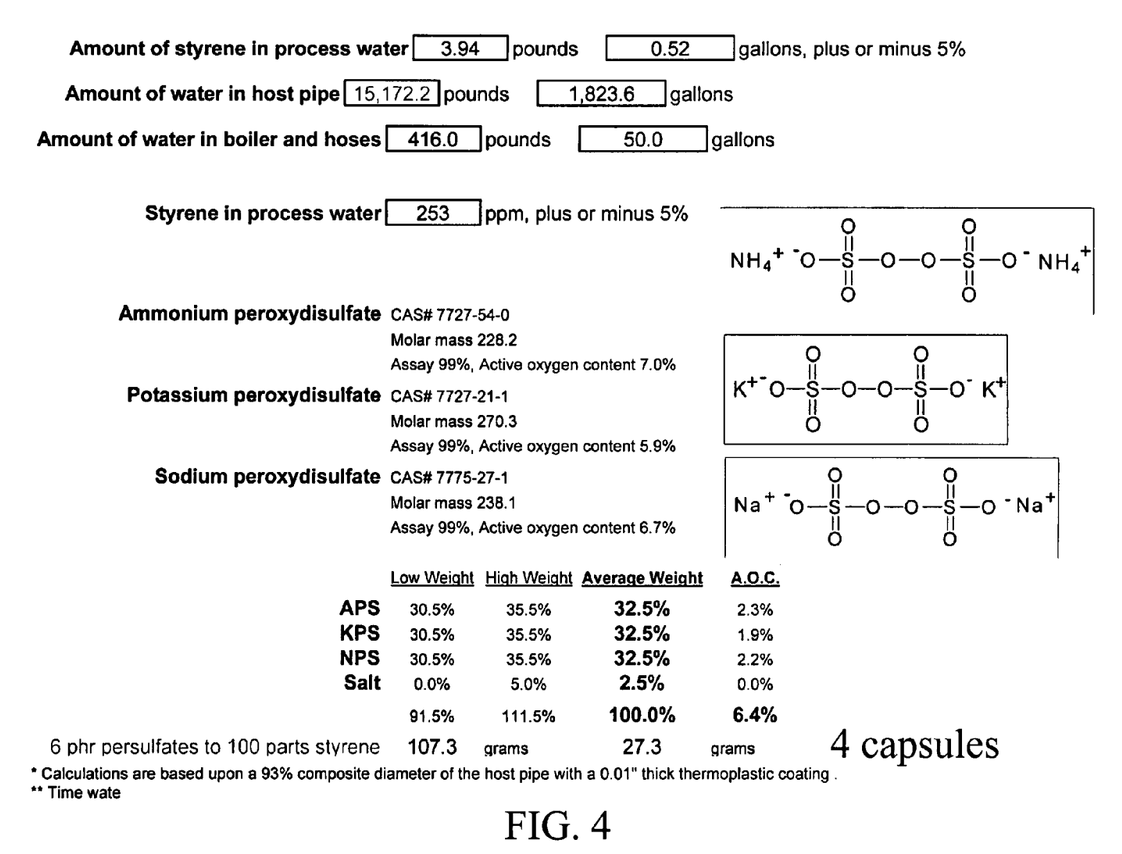
FIG. 4. is a calculation for the amount of styrene in the Cured-In-Place Pipe process water.
Figure 5:
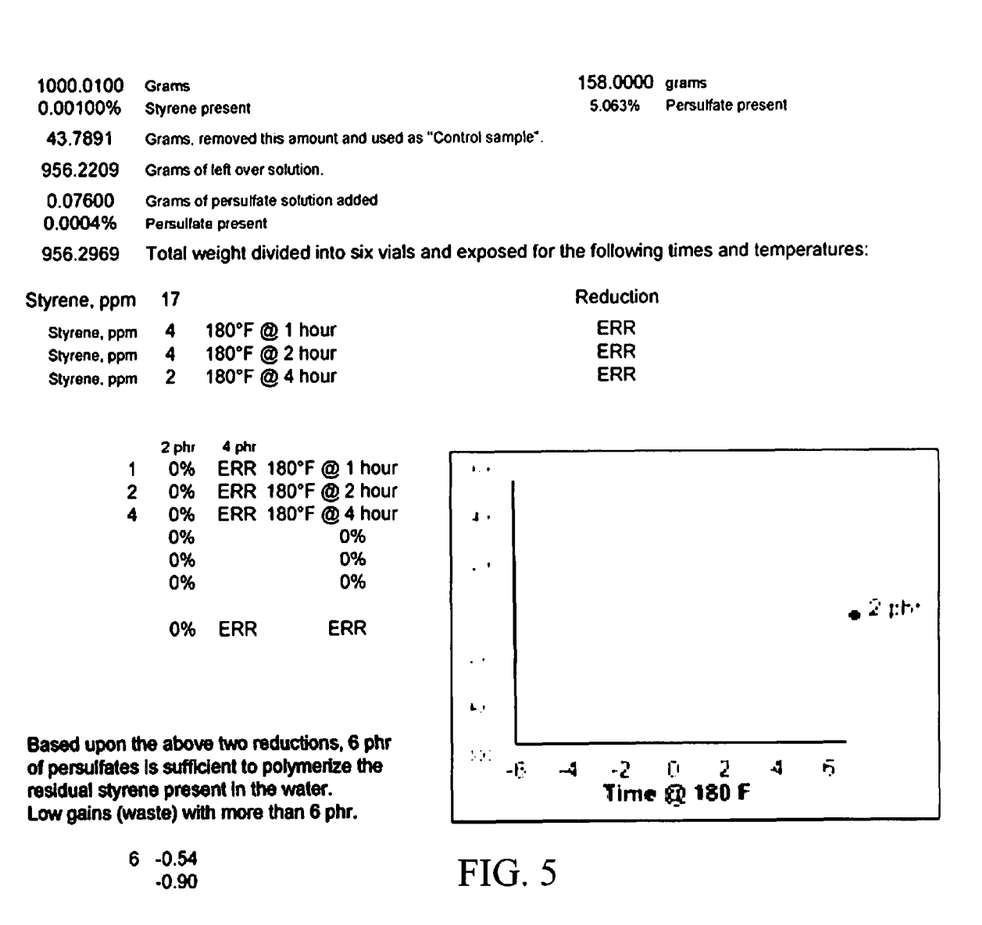
FIG. 5 is data series table and a graphical representation of a polymerization rate series analysis.
Figure 6:
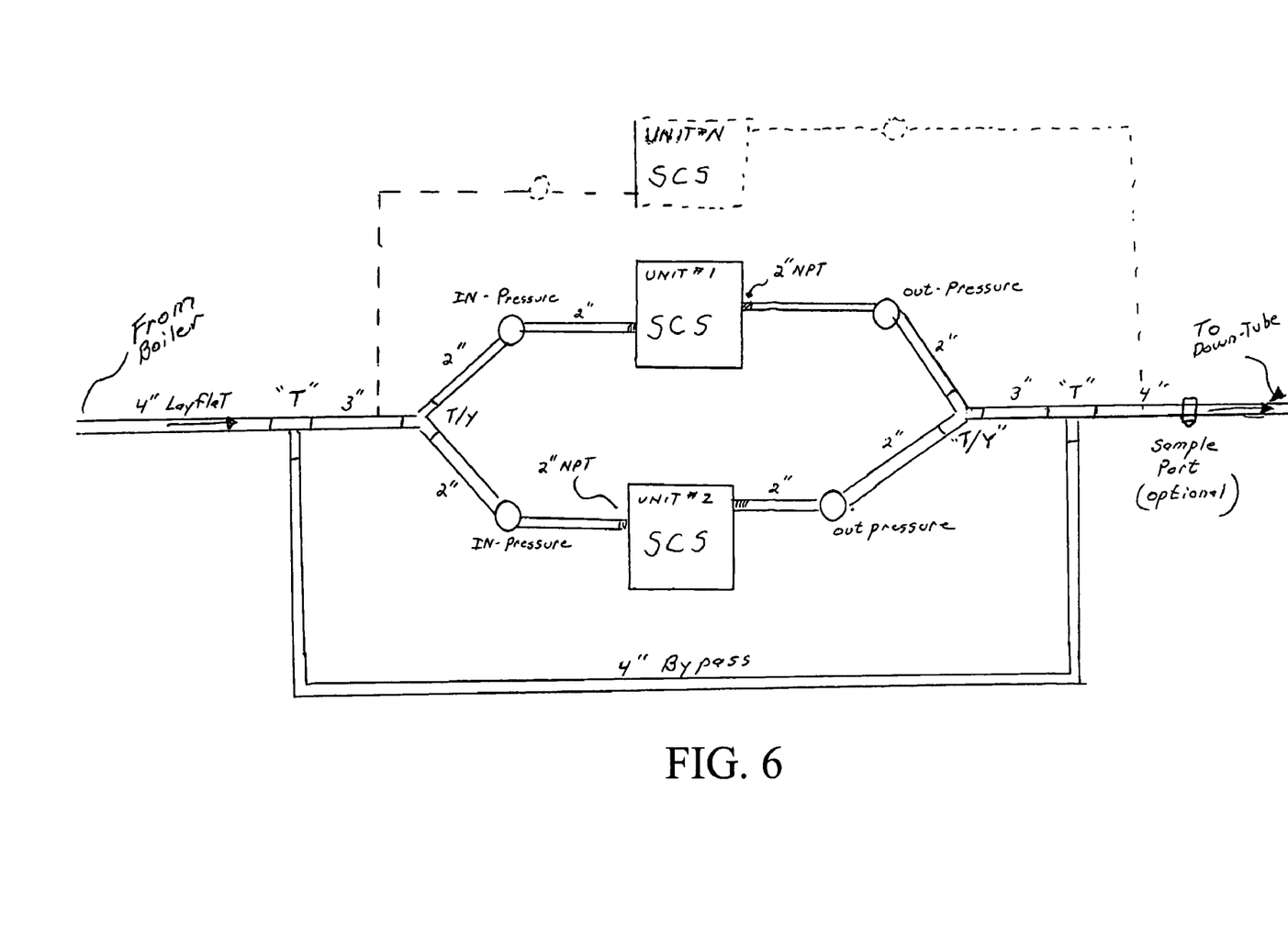
FIG. 6 is a block diagram of a suitable filtering system that may be deployed in unison with the mentioned styrene reducing agent capsules.

FIG. 1 is a spreadsheet analysis of the foregoing calculations for a specific example, which conclude that a total of four (4) capsules of the present mixture (bottom right) should be added to achieve 84% styrene reduction, given 240 ppm styrene in 1,873.6 gallons of process water. Note that cooling water is generally added to reduce the process water below 100 degrees F. prior to release. Holes are put in the terminal end to release water while filling with cooling water. Cooling cycles range from one (1) to three (3) hours but vary according to thickness (thicker liners require longer cool-down cycles) and type of resin system used. The total volume including cooling water is generally 2.5 to 3 times the water used to inflate the liner and hold the liner against the host pipe or surface to be coated, in this example 5,621 gallons. Treatment of 5,621 gallons is calculated by entering 2,454 feet with one hour process time, the result being 4 capsules. If three hour cooling from 180 to 100, then 10 capsules and so on.

In addition to the styrene reduction agent described above, a calibrated amount of the catalyst is added based on a weight/weight ratio of the amount of pure $H_2O_2$ per volume of cure water. 0.36 ounces of pure $H_2O_2$ per 5,000 Gal of cure water is sufficient to trigger the catalytic reaction and achieve 96% reduction. Thus, if a 3% solution of Hydrogen Peroxide is used, 12 fluid ounces of diluted $H_2O_2$ may be used to treat each 5,000 Gal of cure water.

The $H_2O_2$ may be added into the cure water by any of the following methods:

1) Direct application into water source . . . .
    a. Directly into down-tube
    b. Directly into boiler while filling reservoir
  2) Pump from premixed tank into manifold or Styrene Capture System outlet prior to entering surface to be treated (preferred if there are concerns about boiler/piping damage by injection at the input manifold).
  3) Spray/brush diluted solution directly onto tube coating.

The following are test results using a calibrated amount of styrene reduction agent capsules and catalyst applied directly to a styrene-containing medium, Hexion Specialty Chemical unsaturated vinyl ester resin 780-1115 (30% styrene): 1.7 g (0.68 g).

Example 1

Hydrogen Peroxide Solution diluted (DI) to 3% by weight: 256 g (8.45 g)

Styrene Reduction Agent (SRA): 34:33:33 mix ratio: 0.1 g

The SRA and $H_2O_2$ were mixed to a resin emulsion state and coated onto the medium, which was then temperature cured until non tacky with the following parameters.

1) Cured without heat for 18 hrs
  2) Same ratio: Heat to 90 F.: Cured non-tacky: 12 HRS
  3) Same ratio: Heat to 105 F.: Cured non-tacky: 5 HRS
  4) Same ratio: Heat to 125 F.: Cured non-tacky: 3 Hrs
  5) Same Ratio: Heat to 180 F.: Cured non-tacky: 3-5 minutes Tested by GC, EPA method 8260-B for volatile organic carbons,

| sample | Benzene (PPM) | Toluene (PPM) | Ethylbenzene (PPM) | Xylenes (PPM) | Styrene (PPM) |
|---|---|---|---|---|---|
| 1 | 0.491 | 0.035 | 0.049 | 0.028 | 117 |
| 2 | 0.464 | 0.034 | 0.061 | 0.022 | 128 |
| 3 | 0.683 | 0.066 | 0.353 | 0.425 | 446 |
| 4 | 0.522 | 0.046 | 0.324 | 0.413 | 136 |

Addition of Styrene reduction Agent: 6 Pph per 100 parts styrene, +$H_2O_2$ 6 Pph per 100 parts styrene: Equal Parts H2O2 (StyRedux SP): Styrene reduction Agent (StyRedux)

| sample | Benzene (PPM) | Toluene (PPM) | Ethylbenzene (PPM) | Xylenes (PPM) | Styrene (PPM) | Percent Styrene Reduction (%) |
|---|---|---|---|---|---|---|
| 1 | ND | ND | ND | ND | ND | 100 |
| 2 | ND | ND | ND | ND | 1.68 | 99.7 |
| 3 | ND | ND | ND | ND | 6.64 | 99.5 |
| 4 | ND | ND | ND | ND | ND | 100 |
| | | | | | Ave. | 99.8 |

The Styrene Reduction Agent or the $H_2O_2$ can be pumped from a reservoir into the "clean water" input of the filter system. The hose from the filter system is attached to a spare/ or tied into an existing recirculation hose for dispensing throughout the curing liner.

The Agent and/or $H_2O_2$ can be added directly to the cure water by the inversion point access.

The Agent and/or $H_2O_2$ can be added directly to the make-up/inversion water through the water supply feed.

One skilled in the art should expect that increasing concentration ratios of either the styrene reduction agent and/or hydrogen peroxide should increase the conversion results.

It must be noted that the best technology or work practices are always defined in relation to a specific company. For example, what might be the best way to minimize waste at one company may be very different from the best methods achieving the same objectives at another company. In each case, what is the "best practice" or "best available technology" will depend on the availability of resources, what materials are processed, how they are processed, what products are made, local community or regulatory requirements, and other factors. However, in all such cases the present invention will provide a catalyzed styrene reduction agent that effectively and economically reduces styrene emissions in Cured-In-Place Pipe, closed molding processes.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims:

I claim:

1. A composition for reducing styrene emissions from thermoset unsaturated resin curing during Cured-In-Place Pipe (CIPP) installation in aqueous environments, consisting essentially of:
   cure water from said CIPP installation;
   a persulfate salt mixture including a plurality of different species of peroxodisulfates pre-mixed in calibrated amounts and pre-packaged; and
   hydrogen peroxide that functions as a catalyst;
   whereby said pre-packaged persulfate salt mixture is adapted for emulsion polymerization reduction of styrene emission when added to said cure water from said CIPP installation, and said hydrogen peroxide catalyst is adapted for catalyzing said emulsion polymerization reduction by said persulfate salt mixture.

2. The composition according to claim 1, wherein said persulfate salt mixture includes any one from among the group including ammonium persulfate (APS), potassium persulfate (KPS) and sodium persulfate (NPS).

3. The composition according to claim 2, further comprising sodium chloride (NaCL).

4. The composition according to claim 3, wherein said persulfate salt mixture and NaCL are formed as of compressed crystalline powder pre-packaged in water-soluble capsules.

5. The composition according to claim 2, wherein said mixture of persulfate salts consists essentially of 32.5% by weight ammonium persulfate (APS), 32.5% by weight potassium persulfate (KPS), and 32.5% by weight sodium persulfate (NPS).

6. The composition according to claim 5, further comprising approximately 2%-2.5% by weight NaCL.

7. The composition according to claim 3, wherein said mixture of persulfates salts comprises a range of from 25-35% ammonium persulfate (APS), a range of from 25-35% potassium persulfate (KPS), and a range of from 0.1 to 10% NaCL.

* * * * *